US012764759B2

(12) United States Patent
Zhang et al.

(10) Patent No.: US 12,764,759 B2
(45) Date of Patent: Oct. 13, 2026

(54) METHODS AND APPARATUS OF MONITORING BEHAVIOUR DETERMINATION FOR OVERLAPPING EPDCCH AND CSI-RS, SSB, PDSCH, AND/OR PDCCH

(71) Applicant: Lenovo (Beijing) Limited, Beijing (CN)

(72) Inventors: Yi Zhang, Beijing (CN); Chenxi Zhu, Beijing (CN); Wei Ling, Beijing (CN); Bingchao Liu, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 228 days.

(21) Appl. No.: 18/707,440

(22) PCT Filed: Nov. 4, 2021

(86) PCT No.: PCT/CN2021/128730
§ 371 (c)(1),
(2) Date: May 3, 2024

(87) PCT Pub. No.: WO2023/077361
PCT Pub. Date: May 11, 2023

(65) Prior Publication Data
US 2026/0156653 A1 Jun. 4, 2026

(51) Int. Cl.
*H04W 72/232* (2023.01)

(52) U.S. Cl.
CPC .................................. *H04W 72/232* (2023.01)

(58) Field of Classification Search
CPC .................................................... H04W 72/232
See application file for complete search history.

(56) References Cited

U.S. PATENT DOCUMENTS

2020/0221487 A1* 7/2020 Lee ........................ H04L 5/0091
2020/0351841 A1* 11/2020 Cirik .................... H04B 7/0695
(Continued)

FOREIGN PATENT DOCUMENTS

CN 110972515 A 4/2020

OTHER PUBLICATIONS

Correction on interpreting QCL TypeD across multiple CORESETs with different QCL TypeD properties (Chang Request); Ericsson; 3GPP TSG-RAN WG1 Meeting #96 R1-1901853 Athens, Greece, Feb. 25-Mar. 1, 2019 (Year: 2019).*
(Continued)

*Primary Examiner* — Benjamin H Elliott, IV
(74) *Attorney, Agent, or Firm* — FIG. 1 Patents

(57) ABSTRACT

Methods and apparatus of monitoring behaviour determination for overlapping ePDCCH and CSI-RS/SSB/PDSCH/PDCCH are disclosed. The method includes: receiving, by a receiver, a configuration for a transmission of enhanced Physical Downlink Control Channel (ePDCCH) with two Transmission Configuration Indication (TCI) states including two Quasi Co-Location Type D (QCL-TypeD) properties; and determining, by a processor, a monitoring behaviour based on a QCL-TypeD assumption and/or a predefined priority rule, wherein at least one symbol of the ePDCCH overlaps with a transmission of Channel State Information Reference Signal (CSI-RS), Synchronization Signal Block (SSB), Physical Downlink Shared Channel (PDSCH), and/or Physical Downlink Control Channel (PDCCH).

20 Claims, 4 Drawing Sheets

(56) References Cited

U.S. PATENT DOCUMENTS

| | | | | |
|---|---|---|---|---|
| 2021/0111846 | A1* | 4/2021 | Lee | H04L 5/0053 |
| 2021/0168779 | A1* | 6/2021 | Mondal | H04L 5/0053 |
| 2021/0289377 | A1* | 9/2021 | Seo | H04B 7/0695 |
| 2021/0314927 | A1* | 10/2021 | Noh | H04L 5/0053 |
| 2021/0321442 | A1* | 10/2021 | Jung | H04L 5/0053 |
| 2023/0413081 | A1* | 12/2023 | Zhang | H04L 5/0035 |

OTHER PUBLICATIONS

Lenovo , et al., “Enhancements on Multi-TRP for PDCCH, PUCCH and PUSCH”, 3GPP TSG RAN WG1 #106-e, R1-2106667, [retrieved May 2, 2024]. Retrieved from the Internet <https://www.3gpp.org/dynareport?code=TDocExMtg--R1-106-e--60039.htm>, Aug. 16, 2021, 17 pages.

PCT/CN2021/128730 , “International Preliminary Report on Patentability”, PCT Application No. PCT/CN2021/128730, May 16, 2024, 4 pages.

PCT/CN2021/128730 , “International Search Report and Written Opinion”, International Application No. PCT/CN2021/128730, Jul. 29, 2022, 6 pages.

Qualcomm Incorporated , “Enhancements on HST-SFN deployment”, 3GPP TSG-RAN WG1 Meeting #106bis-e, R1-2110169, [retrieved May 2, 2024]. Retrieved from the Internet <https://www.3gpp.org/dynareport?code=TDocExMtg--R1-106-bis-e--60046.htm>, 23 pages.

* cited by examiner

Case A: FDM based ePDCCH with repetition

Case B: TDM based ePDCCH with repetition

Case C: SFN based ePDCCH

METHODS AND APPARATUS OF MONITORING BEHAVIOUR DETERMINATION FOR OVERLAPPING EPDCCH AND CSI-RS, SSB, PDSCH, AND/OR PDCCH

FIELD

The subject matter disclosed herein relates generally to wireless communication and more particularly relates to, but not limited to, methods and apparatus of monitoring behaviour determination for overlapping ePDCCH and CSI-RS/SSB/PDSCH/PDCCH.

BACKGROUND

The following abbreviations and acronyms are herewith defined, at least some of which are referred to within the specification:

Third Generation Partnership Project (3GPP), 5th Generation (5G), New Radio (NR), 5G Node B, Long Term Evolution (LTE), LTE Advanced (LTE-A), E-UTRAN Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Physical Downlink Control Channel (PDCCH), Physical Downlink Shared Channel (PDSCH), Physical Broadcast Channel (PBCH), Enhanced Physical Downlink Control Channel (ePDCCH), Bandwidth Part (BWP), Control Resource Set (CORESET), Channel State Information (CSI), Channel State Information Reference Signal (CSI-RS), Common Search Space (CSS), Downlink Control Information (DCI), Frequency-Division Multiplexing (FDM), Frequency Division Multiple Access (FDMA), Index/Identifier (ID), Information Element (IE), Resource Element (RE), Radio Resource Control (RRC), Reference Signal (RS), Single Frequency Network (SFN), Synchronization Signal Block (SSB), Time-Division Multiplexing (TDM), Transmission and Reception Point (TRP), UE-specific Search Space (USS), Frequency Range 1 (FR1), Frequency Range 2 (FR2), Non-Zero-Power CSI-RS (NZP-CSI-RS), Transmission Configuration Indication (TCI), Tracking Reference Signal (TRS), Technical Specification (TS), Quasi Co-Location (QCL), Demodulation Reference Signal (DM-RS), Search Space (SS), Synchronization Signals and Physical Broadcast Channel (SS/PBCH), Layer 1 Reference Signal Received Power (L1-RSRP), Layer 3 Reference Signal Received Power (L3-RSRP).

In wireless communication, such as a Third Generation Partnership Project (3GPP) mobile network, a wireless mobile network may provide a seamless wireless communication service to a wireless communication terminal having mobility, i.e., user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission may be from multiple TRPs. The spatial diversity may be exploited in addition to the time-frequency diversity. Enhanced Physical Downlink Control Channel (ePDCCH) can be transmitted with multiple repetition from multiple TRPs to improve PDCCH transmission reliability and robustness. Multiple transmissions of the ePDCCH may be transmitted from a same TRP or some different TRPs.

Two antenna ports are said to be quasi co-located (QCL) if properties of the channel over which a symbol on one antenna port is conveyed can be inferred from the channel over which a symbol on the other antenna port is conveyed. Common 5G NR QCL types include Type-A, Type-B, Type-C and Type-D, where QCL-TypeD is related to spatial RX parameter.

SUMMARY

Methods and apparatus of monitoring behaviour determination for overlapping ePDCCH and CSI-RS/SSB/PDSCH/PDCCH are disclosed.

According to a first aspect, there is provided a method, including: receiving, by a receiver, a configuration for a transmission of enhanced Physical Downlink Control Channel (ePDCCH) with two Transmission Configuration Indication (TCI) states including two Quasi Co-Location Type D (QCL-TypeD) properties; and determining, by a processor, a monitoring behaviour based on a QCL-TypeD assumption and/or a predefined priority rule, wherein at least one symbol of the ePDCCH overlaps with a transmission of Channel State Information Reference Signal (CSI-RS), Synchronization Signal Block (SSB), Physical Downlink Shared Channel (PDSCH), and/or Physical Downlink Control Channel (PDCCH).

According to a second aspect, there is provided a method, including: transmitting, by a transmitter, a configuration for a transmission of enhanced Physical Downlink Control Channel (ePDCCH) with two Transmission Configuration Indication (TCI) states including two Quasi Co-Location Type D (QCL-TypeD) properties; and determining, by a processor, a monitoring behaviour of a remote device based on a QCL-TypeD assumption and/or a predefined priority rule, wherein at least one symbol of the ePDCCH overlaps with a transmission of Channel State Information Reference Signal (CSI-RS), Synchronization Signal Block (SSB), Physical Downlink Shared Channel (PDSCH), and/or Physical Downlink Control Channel (PDCCH).

According to a third aspect, there is provided an apparatus, including: a receiver that receives a configuration for a transmission of enhanced Physical Downlink Control Channel (ePDCCH) with two Transmission Configuration Indication (TCI) states including two Quasi Co-Location Type D (QCL-TypeD) properties; and a processor that determines a monitoring behaviour based on a QCL-TypeD assumption and/or a predefined priority rule, wherein at least one symbol of the ePDCCH overlaps with a transmission of Channel State Information Reference Signal (CSI-RS), Synchronization Signal Block (SSB), Physical Downlink Shared Channel (PDSCH), and/or Physical Downlink Control Channel (PDCCH).

According to a fourth aspect, there is provided an apparatus, including: a transmitter that transmits a configuration for a transmission of enhanced Physical Downlink Control Channel (ePDCCH) with two Transmission Configuration Indication (TCI) states including two Quasi Co-Location Type D (QCL-TypeD) properties; and a processor that determines a monitoring behaviour of a remote device based on a QCL-TypeD assumption and/or a predefined priority rule, wherein at least one symbol of the ePDCCH overlaps with a transmission of Channel State Information Reference Signal (CSI-RS), Synchronization Signal Block (SSB), Physical Downlink Shared Channel (PDSCH), and/or Physical Downlink Control Channel (PDCCH).

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
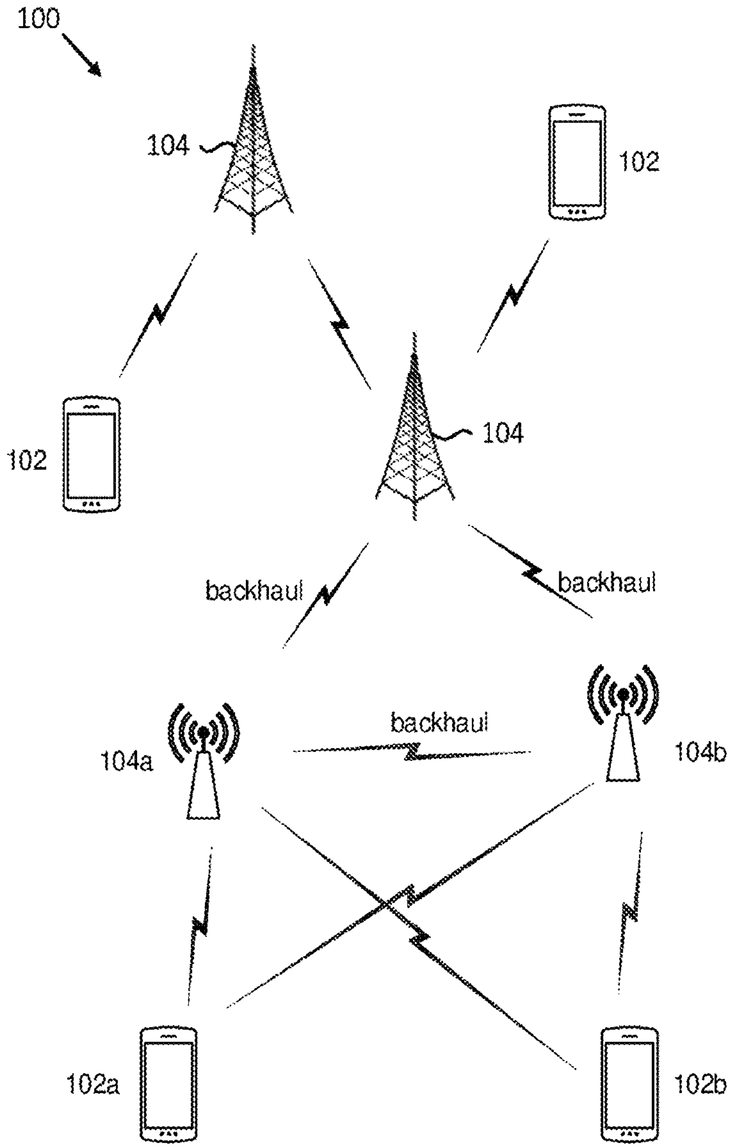
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, may be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function (s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102*a*, 102*b*, 102*c*, and 102*d*, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104*a*. In some embodiments, the network equipment may be a gNB 104 that controls a number of TRPs 104*a*. In addition, there is a backhaul between two TRPs 104*a*. In some other embodiments, the network equipment may be a TRP 104*a* that is controlled by a gNB.

Communication links are provided between the NEs 104, 104*a* and the UEs 102, 102*a*, respectively, which, for example, may be NR UL/DL communication links. Some UEs 102, 102*a* may simultaneously communicate with different Radio Access Technologies (RATs), such as NR and LTE.

In some embodiments, the UE 102*a* may be able to communicate with two or more TRPs 104*a* that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
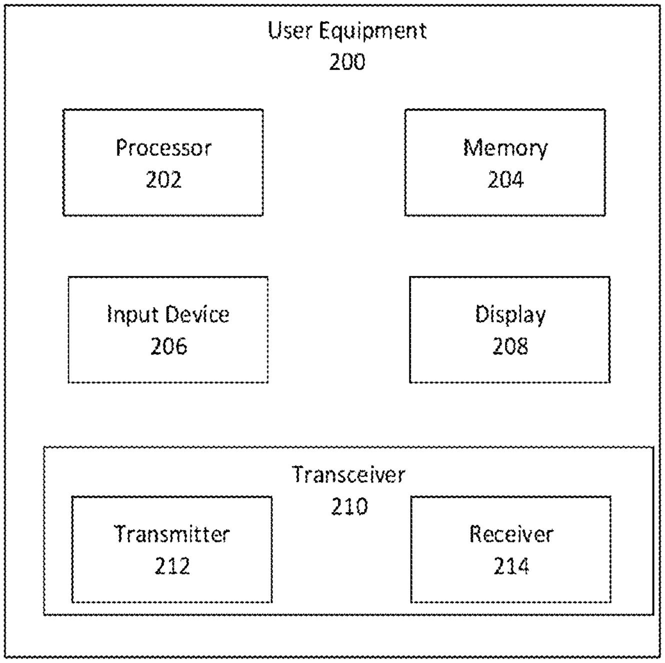
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
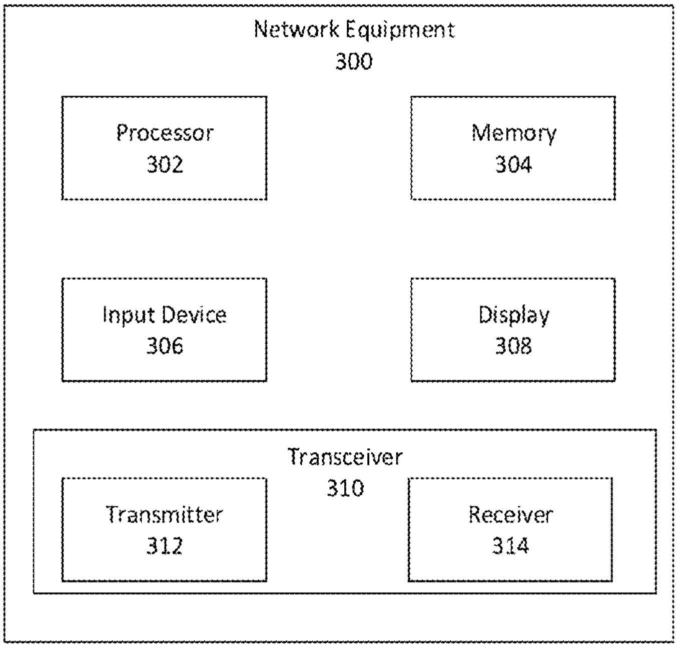
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

Priority rules may be defined to determine two QCL-TypeD properties for multiple overlapping CORESETs for UE supporting reception with two different beams and configured with PDCCH repetition.

For a UE supporting reception with two different beams and configured with PDCCH repetition, to determine the two QCL-TypeD properties for multiple monitored overlapping CORESETs, the UE may reuse legacy priority rule to identify the first QCL-TypeD property, and then identify the second QCL-TypeD according to one of the SS sets that is linked with a SS set with the first QCL-TypeD among the multiple overlapping CORESETs.

In the case of multiple such SS set pairs, Release 15 priority order is followed for the second QCL-TypeD determination. In the case of no such SS set pair, a second QCL-TypeD is not determined. Simultaneous two beam reception for PDCCH repetition may be UE optional.

QCL-Type D assumption may be further studied for CSI-RS with higher layer parameter repetition not being set to 'on' when it overlaps with multiple CORESETs with different QCL-TypeD.

According to the current specification, UE behaviour is defined when there is overlapping in the time domain between PDCCH and CSI-RS/SSB/PDSCH/PDCCH with multiple QCL-TypeD assumptions.

For overlapping PDCCH and CSI-RS with higher layer parameter repetition not set to 'on' in the same OFDM symbol(s), the same QCL-TypeD is assumed. The detailed description in Technical Specification (TS) 38.214 is shown as follows.

> For a CSI-RS resource associated with a NZP-CSI-RS-ResourceSet with the higher layer parameter repetition set to 'on', the UE shall not expect to be configured with CSI-RS over the symbolsduring which the UE is also configured to monitor the CORESET, while for other NZP-CSI-RS-ResourceSet configurations, if the UE is configured with a CSI-RS resource and a search space set associated with a CORESET in the same OFDM symbol(s), the UE may assume that the CSI-RS and a PDCCH DM-RS transmitted in all the search space sets associated with CORESET are quasi co-located with 'QCL-TypeD', if 'QCL-TypeD' is applicable. This also applies to the case when CSI-RS and the CORESET are in different intra-band component carriers, if 'QCL-TypeD' is applicable. Furthermore, the UE shall not expect to be configured with the CSI-RS in PRBs that overlap those of the CORESET in the OFDM symbols occupied by the search space set(s).

That is, the same QCL-TypeD is assumed between PDCCH and CSI-RS with higher layer parameter 'repetition' not set to 'on'. In Release 17, TDM and FDM based PDCCH with repetition and SFN based ePDCCH are introduced to improve transmission reliability. Thus, monitoring schemes and QCL-TypeD determining schemes need to be further discussed for overlapping between ePDCCH (e.g., PDCCH from USS or Type3 CSS) and CSI-RS, including both periodic and aperiodic CSI-RS.

For CSI-RS, the beam information may be indicated by qcl-InfoPeriodicCSI-RS in RRC Information Element (IE) NZP-CSI-RS-Resource for periodic CSI-RS and qcl-info in RRC IE CSI-AssociatedReportConfigInfo for aperiodic CSI-RS. The detailed descriptions of the two IEs in TS 38.331 are shown as follows.

NZP-CSI-RS-Resource information element

```
-- ASN1START
-- TAG-NZP-CSI-RS-RESOURCE-START
NZP-CSI-RS-Resource ::=      SEQUENCE {
   nzp-CSI-RS-ResourceId         NZP-CSI-RS-ResourceId,
   resourceMapping               CSI-RS-ResourceMapping,
   powerControlOffset            INTEGER (−8..15),
   powerControlOffsetSS          ENUMERATED{db−3, db0, db3, db6}
OPTIONAL,   -- Need R
   scramblingID                  ScramblingId,
   periodicityAndOffset          CSI-ResourcePeriodicityAndOffset
OPTIONAL,   -- Cond PeriodicOrSemiPersistent
   qcl-InfoPeriodicCSI-RS        TCI-StateId
OPTIONAL,   -- Cond Periodic
   ...
}
-- TAG-NZP-CSI-RS-RESOURCE-STOP
-- ASN1STOP
```

For a target periodic CSI-RS, the parameter qcl-InfoPeriodicCSI-RS contains a reference to one TCI-State in TCI-States for providing the QCL source and QCL type. For periodic CSI-RS, the source can be SSB or another periodic-CSI-RS. It refers to the TCI-State which has this value for tci-StateId and is defined in tci-StatesToAddModList in the PDSCH-Config included in the BWP-Downlink corresponding to the serving cell and to the DL BWP to which the resource belongs to.

CSI-AperiodicTriggerStateList information element

```
-- ASN1START
-- TAG-CSI-APERIODICTRIGGERSTATELIST-START
CSI-AperiodicTriggerStateList ::=        SEQUENCE (SIZE (1..maxNrOfCSI-AperiodicTriggers))
OF CSI-AperiodicTriggerState
CSI-AperiodicTriggerState ::=           SEQUENCE {
   associatedReportConfigInfoList           SEQUENCE
(SIZE(1..maxNrofReportConfigPerAperiodicTrigger)) OF CSI-AssociatedReportConfigInfo,
   ...
}
CSI-AssociatedReportConfigInfo ::=        SEQUENCE {
   reportConfigId                  CSI-ReportConfigId,
   resourcesForChannel                 CHOICE {
      nzp-CSI-RS                      SEQUENCE {
         resourceSet                      INTEGER (1..maxNrofNZP-CSI-RS-
ResourceSetsPerConfig),
         qcl-info                     SEQUENCE (SIZE(1..maxNrofAP-CSI-RS-
ResourcesPerSet)) OF TCI-StateId
OPTIONAL   -- Cond Aperiodic
      },
      csi-SSB-ResourceSet                 INTEGER (1..maxNrofCSI-SSB-
ResourceSetsPerConfig)
   },
   csi-IM-ResourcesForInterference            INTEGER (1..maxNrofCSI-IM-
ResourceSetsPerConfig)            OPTIONAL, -- Cond CSI-IM-ForInterference
   nzp-CSI-RS-ResourcesForInterference       INTEGER (1..maxNrofNZP-CSI-RS-
ResourceSetsPerConfig)        OPTIONAL, -- Cond NZP-CSI-RS-
ForInterference
   ...
}
-- TAG-CSI-APERIODICTRIGGERSTATELIST-STOP
-- ASN1STOP
```

The parameter qcl-info contains a list of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on.

For overlapping between PDCCH and SSB, the PDCCH candidate is not monitored when at least one RE for PDCCH candidate from a search space set other than Type0-PDCCH CSS set overlaps with at least one RE for SS/PBCH block. The detailed information is defined in TS 38.213 as follows.

For monitoring of a PDCCH candidate by a UE, if the UE
   has received ssb-PositionsInBurst in SIB1 and has not received ssb-PositionsInBurst in ServingCellConfigCommon for a serving cell, and
   does not monitor PDCCH candidates in a Type0-PDCCH CSS set, and
   at least one RE for a PDCCH candidate overlaps with at least one RE of a candidate SS/PBCH block corresponding to a SS/PBCH block index provided by ssb-PositionsInBurst in SIB1,
the UE is not required to monitor the PDCCH candidate.
For monitoring of a PDCCH candidate by a UE, if the UE
   has received ssb-PositionsInBurst in ServingCellConfigCommon for a serving cell, and
   does not monitor PDCCH candidates in a Type0-PDCCH -continued > CSS set, and
> at least one RE for a PDCCH candidate overlaps with at least one RE of a candidate SS/PBCH block corresponding to a SS/PBCH block index provided by ssb-PositionsInBurst in ServingCellConfigCommon,
> the UE is not required to monitor the PDCCH candidate.
> If a UE monitors the PDCCH candidate for a Type0-PDCCH CSS set on the serving cell according to the procedure described in Clause 13, the UE may assume that no SS/PBCH block is transmitted in REs used for monitoring the PDCCH candidate on the serving cell.

The UE behaviour is defined in the case where there is overlapping of at least one RE between PDCCH candidates and SSB. In Release 17, TDM and FDM based PDCCH with repetition and SFN based ePDCCH are introduced to improve transmission reliability. Thus, monitoring schemes and QCL-TypeD determining schemes need to be further discussed for overlapping between ePDCCH (e.g., PDCCH from USS or Type3 CSS) and SSB.

For overlapping between PDSCH and PDCCH, PDCCH is of high priority for monitoring in the case where there is overlapping in at least one symbol but with different QCL-TypeD. The detailed information in TS 38.214 is shown as follows.

> Independent of the configuration of tci-PresentInDCI and tci-PresentInDCI-ForFormat1_2 in RRC connected mode, if the offset between the reception of the DL DCI and the corresponding PDSCH is less than the threshold timeDurationForQCL, the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the 'QCL-TypeD' of the PDSCH DM-RS is different from that of the PDCCH DM-RS with which they overlap in at least one symbol, the UE is expected to prioritize the reception of PDCCH associated with that CORESET.

The UE behaviour is defined in the case where there is overlapping in at least one symbol between PDCCH and PDSCH with different QCL-TypeD. In Release 17, TDM and FDM based PDCCH with repetition and SFN based ePDCCH are introduced to improve transmission reliability. Thus, monitoring schemes and QCL-TypeD determining schemes need to be further discussed for overlapping between ePDCCH and PDSCH.

For overlapping in at least one symbol between PDCCH in a Type0/0A/2/3 PDCCH CSS set or in a USS set and PDCCH in a Type1-PDCCH CSS set or an associated PDSCH with different QCL-TypeD assumptions, UE does not expect to monitor a PDCCH in a Type0/0A/2/3 PDCCH CSS set or in a USS set. The detailed information in TS 38.213 is shown as follows > For single cell operation or for operation with carrier aggregation in a same frequency band, a UE does not expect to monitor a PDCCH in a Type0/0A/2/3-PDCCH CSS set or in a USS set if a DM-RS for monitoring a PDCCH in a Type1-PDCCH CSS set does not have same QCL-TypeD properties [6, TS 38.214] with a DM-RS for monitoring the PDCCH in the Type0/0A/2/3-PDCCH CSS set or in the USS set, and if the PDCCH or an associated PDSCH overlaps in at least one monitors in a Type1-PDCCH CSS set or with an associated PDSCH.

The UE behaviour is defined in the case where there is overlapping in at least one symbol between PDCCH from Type0/0A/2/3 PDCCH CSS set or in a USS set and PDCCH from Type1-PDCCH CSS set or associated PDSCH. In Release 17, ePDCCH may be used for transmission of PDCCH from Type 3 CSS.

According to the current 3GPP Technical Specifications, UE behaviour is defined when there is overlapping in the time domain between PDCCH and CSI-RS/SSB/PDSCH/PDCCH with multiple QCL-TypeD assumptions. However, the UE behaviour is specified based on normal PDCCH where only one TCI state, including one QCL-TypeD property, is used for PDCCH transmission. In Release 17, TDM/FDM based PDCCH with repetition and SFN based ePDCCH are introduced to improve transmission reliability where enhanced transmission scheme can be used for PDCCH from USS or Type3 CSS. For ePDCCH, there may be two QCL-TypeD properties for two overlapping CORESETs for FDM based repetition transmission and or SFN based transmission. For TDM based enhanced PDCCH, ePDCCH may be decoded successfully by monitoring only one of linked candidates if channel quality is good. In the disclosure, different ePDCCH monitoring schemes and corresponding QCL-TypeD determination schemes are proposed for cases where there is time overlapping between ePDCCH and CSI-RS/SSB/PDSCH/PDCCH with multiple QCL-TypeD assumptions.

Specifically, UE monitoring or detection schemes and QCL-TypeD determination schemes are defined for cases where there is overlapping of at least one OFDM symbol between ePDCCH and other channel(s)/signal(s). For ePDCCH, it may be TDM based PDCCH with repetition, FDM based PDCCH with repetition or PDCCH with enhanced SFN transmission, which are specified in Release 17. For other channels/signals, they may be periodic and aperiodic CSI-RS with 'repetition' not set on (which is referred to as CSI-RS for short in the disclosure), SSB, PDSCH including special PDSCH scheduled by PDCCH from Type1 CSS, PDCCH from Type 1 CSS (which is referred to as PDCCH for short in the disclosure).

Figure 4A:
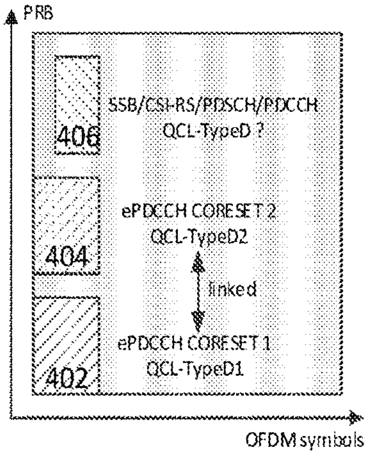
FIGS. 4A to 4C are schematic diagrams illustrating examples of overlapping between CSI-RS/SSB/PDSCH/PDCCH and FDM based ePDCCH with repetition, TDM based ePDCCH with repetition, SFN based ePDCCH, respectively, in accordance with some implementations of the present disclosure.
Figure 4B:
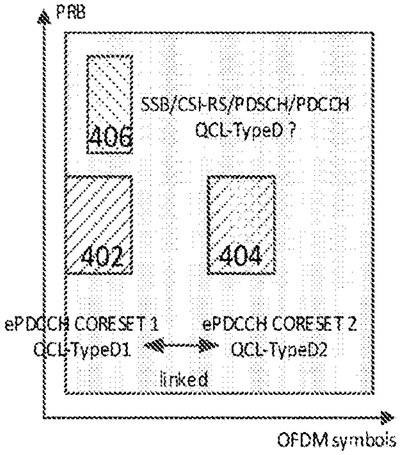
Figure 4C:
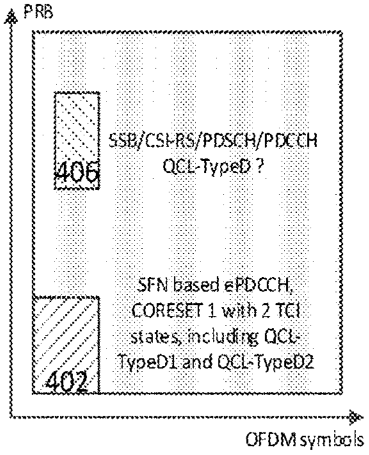

FIGS. 4A to 4C are schematic diagrams illustrating examples of overlapping between CSI-RS/SSB/PDSCH/PDCCH and FDM based ePDCCH with repetition, TDM based ePDCCH with repetition, SFN based ePDCCH, respectively, in accordance with some implementations of the present disclosure. Three overlapping cases are illustrated: case A, case B and case C.

In case A for FDM based ePDCCH with repetition as shown in FIG. 4A, the CSI-RS/SSB/PDSCH/PDCCH 406 overlaps with the linked ePDCCH CORESET 1 402 and ePDCCH CORESET 2 404, which are with QCL-TypeD1 and QCL-TypeD2, respectively.

In case B for TDM based ePDCCH with repetition as shown in FIG. 4B, the CSI-RS/SSB/PDSCH/PDCCH 406 overlaps with the ePDCCH CORESET 1 402 with QCL-TypeD1, which is linked with ePDCCH CORESET 2 404 with QCL-TypeD2.

In case C for SFN based ePDCCH as shown in FIG. 4C, the CSI-RS/SSB/PDSCH/PDCCH 406 overlaps with the SFN based ePDCCH CORESET 1 402 with 2 TCI-states, including QCL-TypeD1 and QCL-TypeD2.

The QCL-TypeD of the CSI-RS/SSB/PDSCH/PDCCH 406 in each of the cases A, B, and C need to be assumed or determined by the UE. In the disclosure, several UE monitoring schemes and corresponding QCL-TypeD determination schemes are proposed in consideration of these three cases.

Two kinds of monitoring schemes are proposed. For the first kind of schemes, some restriction for UE monitoring is introduced on QCL-TypeD of CSI-RS/SSB/PDSCH/PDCCH, which may be determined based on one or two QCL-TypeD from CORESET(s) associated with the monitored search space set(s) of overlapping ePDCCH.

For the second kind of schemes, there is no restriction on QCL-TypeD of CSI-RS/SSB/PDSCH/PDCCH, but priority is defined to determine monitoring or detection behaviour of the UE.

Overlapping Between ePDCCH and CSI-RS

A CSI-RS resource may or may not be configured with QCL-TypeD information. When it is not configured with QCL-TypeD, the UE needs to make an assumption on how to receive it when it is overlapping with ePDCCH. When a CSI-RS is configured with QCl-TypeD, the UE may need to overwrite the configured QCL-TypeD if it conflicts with the QCL-TypeD of the ePDCCH candidates.

For the first kind of scheme, the UE may assume that the CSI-RS and one PDCCH DM-RS port transmitted in monitored search space set, or sets, associated with CORESET, or CORESETs, of the ePDCCH are quasi co-located with QCL-TypeD. In other words, the UE may assume that the QCL-TypeD from CSI-RS is the same as one of QCL-TypeD from CORESET(s) associated with the monitored search space set(s) of the overlapping ePDCCH. For case A and case C in FIGS. 4A and 4C, the UE needs to determine which QCL-TypeD is assumed for the overlapping CSI-RS. Two options may be used.

Option 1-1a: the UE assumes the QCL-TypeD for CSI-RS as the indicated QCL information in the RRC signalling when the QCL information does not conflict with the QCL-TypeD of ePDCCH.

In this option, there is the assumption that QCL-TypeD for CSI-RS indicated by the RRC signalling is the same as one of the QCL-TypeD from CORESETs associated with the monitored search space sets of the overlapping ePDCCH. qcl-InfoPeriodicCSI-RS in the RRC IE NZP-CSI-RS-Resource for periodic CSI-RS and qcl-info in the RRC IE CSI-AssociatedReportConfigInfo for aperiodic CSI-RS can be reused on account of TCI states for ePDCCH being included in the TCI sates for PDSCH. This may provide flexibility for selective transmission of CSI-RS with the desirable QCL information based on actual requirement.

In one example, the enhanced Physical Downlink Control Channel (ePDCCH) is configured with one CORESET with two Transmission Configuration Indication (TCI) states including two Quasi Co-Location Type D (QCL-TypeD) properties. The UE assumes that a QCL-TypeD property for the CSI-RS is the same as one of the two QCL-TypeD properties for CORESET associated with monitored search space set of the ePDCCH. That is, the UE assumes the CSI-RS and one PDCCH DM-RS port transmitted in monitored search space set, associated with CORESET of the ePDCCH are quasi co-located with QCL-TypeD. In another example, the enhanced Physical Downlink Control Channel (ePDCCH) is configured with two CORESETs and each of the associated Transmission Configuration Indication (TCI) states includes one Quasi Co-Location Type D (QCL-TypeD) property. The UE assumes that a QCL-TypeD property for the CSI-RS is the same as one of the two QCL-TypeD properties for two CORESETs associated with two monitored search space sets of the ePDCCH. That is, the UE assumes the CSI-RS and PDCCH DM-RS port transmitted in one of monitored search space sets associated with two CORESETs of the ePDCCH are quasi co-located with QCL-TypeD.

Option 1-1b: the UE assumes that the QCL-TypeD for CSI-RS is one specific QCL-TypeD from CORESETs associated with monitored search space sets of the overlapping ePDCCH.

The specific QCL-TypeD may be a fixed one based on a predefined rule. For example, as a common scheme for both case A and case C illustrated in FIGS. 4A and 4C where there are overlapping between CSI-RS and FDM based ePDCCH with repetition and overlapping between CSI-RS and SFN based ePDCCH respectively, the specific QCL-TypeD may be from the first TCI state. For case A, the first TCI state is from the CORESET associated with the first search space set among the two configured linked search space sets. For case C, the first TCI state is one from two activated TCI states for one CORESET. This option may serve as a default scheme when TCI state is not configured for CSI-RS.

In option 1-1b, the specific QCL-TypeD may be determined based on predefined rule. For one example, the specific QCL-TypeD is configured by RRC signalling to indicate which one is used. For another example, the specific QCL-TypeD is implicitly derived by predefined rule. The predefined rule is that QCL-TypeD is selected based on associated beam with larger L1-RSRP/L3-RSRP.

For the second kind of schemes, there is no assumption on restrictions of QCL-TypeD from CSI-RS. When the QCL-TypeD from CSI-RS is the same as one of the QCL-TypeD from the CORESETs associated with monitored search space sets of the overlapping ePDCCH, the same monitoring behaviour as described in option 1-1a and option 1-1b may be used. When the configured QCL-TypeD from CSI-RS is not the same as any one of the QCL-TypeD from the CORESETs associated with monitored search space sets of the overlapping ePDCCH or QCL-TypeD from CSI-RS is not configured, the priority rule can be defined. For example, two possible rules (i.e., options) are provided as follows.

Option 1-2a: High priority is assigned or set for monitoring ePDCCH, and the UE does not expect to detect CSI-RS with different QCL-TypeD assumption.

This may be a default rule on account of importance of PDCCH and it is at least useful for periodic CSI-RS.

Option 1-2b: High priority is assigned or set for aperiodic CSI-RS, and the UE does not expect to monitor overlapping ePDCCH candidates.

This may be an optimized scheme when it is urgent for aperiodic CSI-RS transmission based on special requirements. For example, it may be used for case B illustrated in FIG. 4B where there is overlapping between CSI-RS and TDM based ePDCCH with repetition. When the channel quality is good, the UE may detect PDCCH successfully only based on non-overlapping repeat PDCCH candidates.

When one candidate is not monitored on account of low priority, the UE still monitors the linked candidate that is not dropped and interprets the DCI based on Release 17 PDCCH rules (e.g., based on reference PDCCH candidate). It can be used for Case A, Case B and Case C.

Overlapping Between ePDCCH and SSB

In the cases where there is overlapping between ePDCCH and SSB, for the first kind of scheme, the UE may assume that the SSB and an ePDCCH DM-RS or an ePDCCH DM-RS port transmitted in one of the monitored search space sets associated with the CORESET are quasi co-located or indirectly quasi co-located with the QCL-TypeD. In other words, there is no overlapping in any OFDM symbols if the SSB and an ePDCCH DM-RS or an ePDCCH DM-RS port transmitted in one of the monitored search space sets associated with the CORESET are not quasi co-located with QCL-TypeD.

As an example for explaining indirect quasi co-location, when the SSB and the TRS are quasi co-located with QCL-TypeD and the DM-RS of the ePDCCH with repetition and the TRS are quasi co-located with QCL-TypeD, the SSB and the DM-RS of the ePDCCH may be considered indirectly quasi co-located with QCL-TypeD; when the SSB and the TRS are quasi co-located with QCL-TypeD and the DM-RS port of the SFN based ePDCCH and the TRS are quasi co-located with QCL-TypeD, the SSB and the DM-RS port of the ePDCCH may be considered indirectly quasi co-located with QCL-TypeD.

In one example, the enhanced Physical Downlink Control Channel (ePDCCH) is configured with one CORESET with two Transmission Configuration Indication (TCI) states including two Quasi Co-Location Type D (QCL-TypeD) properties. The UE assumes that a QCL-TypeD property for the SSB is the same as one of the two QCL-TypeD properties for CORESET associated with monitored search space set of the ePDCCH. That is, the UE assumes the CSI-RS and one PDCCH DM-RS port transmitted in monitored search space set, associated with CORESET of the ePDCCH are quasi co-located with QCL-TypeD. In another example, the enhanced Physical Downlink Control Channel (ePDCCH) is configured with two CORESETs and each of the associated Transmission Configuration Indication (TCI) states includes one Quasi Co-Location Type D (QCL-TypeD) property. The UE assumes that a QCL-TypeD property for the SSB is the same as one of the two QCL-TypeD properties for two CORESETs associated with two monitored search space sets of the ePDCCH. That is, the UE assumes SSB and PDCCH DM-RS port transmitted in one of monitored search space sets associated with two CORESETs of the ePDCCH are quasi co-located with QCL-TypeD.

For this kind of scheme, there is some restriction for ePDCCH on QCL-TypeD assumption if the ePDCCH is scheduled to transmit with SSB in the same OFDM symbol (s).

For the second kind of scheme, there is no restriction on QCL-TypeD from ePDCCH that is overlapping with SSB. When the QCL-TypeD for the SSB is different from any one of QCL-TypeD from CORESET(s) associated with the monitored search space set(s) of the overlapping ePDCCH, monitoring or detection behaviour is determined based on a proposed priority rule. For example, two possible rules (i.e., options) are provided as follows. Option 2-2a: High priority is set for ePDCCH, and the UE does not expect to detect the SSB.

This is designed on account of importance of ePDCCH. The gNB still transmits the SSB without considering whether there is any overlapping with ePDCCH. But the UE uses QCL-TypeD of the ePDCCH for receiving and thus does not detect the SSB.

Option 2-2b: High priority is set for SSB, and the UE does not expect to monitor overlapping ePDCCH candidates.

It is designed on account that multiple functions are carried by SSB and a potential impact may be introduced if the SSB is dropped. For example, it may be used for case B illustrated in FIG. 4B where there is overlapping between CSI-RS and TDM based ePDCCH with repetition. When the channel quality is good, the UE can detect ePDCCH successfully only based on non-overlapping repeat PDCCH candidates.

When one candidate is not monitored on account of low priority, the UE still monitors the linked candidate that is not dropped and interprets the DCI based on Release 17 PDCCH rules (e.g., based on reference PDCCH candidate). It can be used for Case A, Case B and Case C.

The two priority rules, i.e., option 2-2a and option 2-2b may be switched by signalling, e.g., RRC signalling.

Overlapping Between ePDCCH and PDSCH

For the first kind of scheme, the UE may assume that the PDSCH and one or two PDCCH DM-RS ports transmitted in monitored search space set, or sets, associated with CORESET, or CORESETs, of the ePDCCH are quasi co-located with QCL-TypeD. In other words, the UE may assume that the QCL-TypeD from PDSCH is the same as one or two of QCL-TypeD(s) from CORESET(s) associated with the monitored search space set(s) of the overlapping ePDCCH. In this way, the UE with may receive both the ePDCCH and PDSCH based on assumption of two QCL-TypeD.

An exemplary option of the UE monitoring behaviour is provided as follows:

Option 3-1b: the UE assumes that the QCL-TypeD for PDSCH is one specific QCL-TypeD from CORESETs associated with monitored search space sets of the overlapping ePDCCH.

The specific QCL-TypeD may be a fixed one based on a predefined rule. For example, the specific QCL-TypeD may be from the first TCI state of the two TCI states of the ePDCCH. This option may serve as a default scheme when TCI state is not configured for the PDSCH. Optionally or alternatively, the specific QCL-TypeD may be determined based on predefined priority.

In one example, the enhanced Physical Downlink Control Channel (ePDCCH) is configured with one CORESET with two Transmission Configuration Indication (TCI) states including two Quasi Co-Location Type D (QCL-TypeD) properties. The UE assumes that a QCL-TypeD property for the PDSCH is the same as one or two of the two QCL-TypeD properties for CORESET, associated with monitored search space set, of the ePDCCH. That is, the PDSCH and one or two PDCCH DM-RS ports transmitted in monitored search space set, associated with CORESET, of the ePDCCH are quasi co-located with QCL-TypeD. In another example, the enhanced Physical Downlink Control Channel (ePDCCH) is configured with two CORESETs and each of the associated Transmission Configuration Indication (TCI) states includes one Quasi Co-Location Type D (QCL-TypeD) property. The UE assumes that a QCL-TypeD property for the PDSCH is the same as one or two of the two QCL-TypeD properties for two CORESETs associated with two monitored search space sets of the ePDCCH. That is, the UE assumes the PDSCH and PDCCH DM-RS port transmitted in the one or two monitored search space set or sets associated with one two CORESETs of the ePDCCH are quasi co-located with QCL-TypeD.

For the second kind of scheme, there is no restriction on QCL-TypeD from PDSCH that is overlapping with ePDCCH. When the QCL-TypeD from the PDSCH is different from any one of QCL-TypeD from CORESET(s) associated with the monitored search space set(s) of the overlapping ePDCCH and the total number of monitored QCL-TypeD exceeds the UE capability, monitoring or detection behaviour is determined based on a priority rule. In addition to conventional scheme which sets high priority for monitoring or detecting ePDCCH, another possible enhanced scheme (e.g., option 3-2b) is proposed as follows.

Option 3-2b: High priority is set for special PDSCH, and the UE does not expect to monitor overlapping PDCCH candidates.

It is designed for protecting special PDSCH. For example, the PDSCH is scheduled by PDCCH from Type1 CSS. According to the available specification, it has high monitoring or detection priority than PDCCH from Type0/0A/2/3 CSS as discussed earlier. Furthermore, for overlapping case B illustrated in FIG. 4B, the UE may detect ePDCCH successfully only based on non-overlapping repeat ePDCCH candidates, when the channel quality is good.

When one candidate is not monitored on account of low priority, the UE still monitors the linked candidate that is not dropped and interprets the DCI based on Release 17 PDCCH rules (e.g., based on reference PDCCH candidate). It can be used for Case A, Case B and Case C.

This enhanced scheme of assumption on QCL-TypeD may be also used for cases where PDCCH, PDSCH and CSI-RS are overlapping in the same OFDM symbols. UE may assume that the PDCCH, PDSCH, CSI-RS and an ePDCCH DM-RS or a ePDCCH DM-RS are quasi co-located with QCL-TypeD when any of them overlaps in at least one OFDM symbol(s).

Overlapping Between ePDCCH from Type 3 CSS and PDCCH from Type1 CSS

For the first kind of scheme, the UE may assume that the QCL-TypeD for PDCCH from Type 1 CSS is the same as one of the QCL-TypeD from CORESET(s) associated with the monitored search space set(s) of the overlapping ePDCCH from Type3 CSS. With this restriction, UE may receive both ePDCCH from Type3 CSS and PDCCH from Type 1 CSS simultaneously.

Alternatively, a stricter restriction may be made that the UE assumes that ePDCCH from Type3 CSS and PDCCH from Type 1 CSS are quasi-colocated with QCL-TypeD. In this case, only the overlapping case B as illustrated in FIG. 4B may be supported. This alternative may be considered as acceptable since: 1). there is no strong motivation for supporting both TDM and FDM based ePDCCH transmission schemes for ePDCCH from Type3 CSS in the overlapping symbol(s), where normal PDCCH transmission scheme is used for PDCCH from Type1 CSS; and 2). from performance optimization view, TDM based ePDCCH scheme may be satisfactory for ePDCCH from Type3 CSS.

In one example, the enhanced Physical Downlink Control Channel (ePDCCH) is configured with one CORESET with two Transmission Configuration Indication (TCI) states including two Quasi Co-Location Type D (QCL-TypeD) properties. The UE assumes that a QCL-TypeD property for the PDCCH associated with monitored Type 1 CSS is the same as one of the two QCL-TypeD properties for CORESET, associated with monitored search space set of the ePDCCH. That is, the PDCCH DM-RS port transmitted in monitored Type 1 CSS and one PDCCH DM-RS port transmitted in monitored search space set, associated with CORESET of the ePDCCH are quasi co-located with QCL-TypeD. In another example, the enhanced Physical Downlink Control Channel (ePDCCH) is configured with two CORESETs and each of the associated Transmission Configuration Indication (TCI) states includes one Quasi Co-Location Type D (QCL-TypeD) property. The UE assumes that a QCL-TypeD property for the PDCCH associated with monitored Type 1 CSS is the same as one of the two QCL-TypeD properties for two CORESETs associated with two monitored search space sets of the ePDCCH. That is, the UE assumes the PDCCH DM-RS port transmitted in monitored Type 1 CSS and PDCCH DM-RS port transmitted in one of monitored search space sets associated with two CORESETs of the ePDCCH are quasi co-located with QCL-TypeD.

For the second kind of scheme, there is no restriction on QCL-TypeD from CORESET(s) associated with the monitored search space set(s) of the ePDCCH from Type3 CSS that is overlapping with PDCCH from Type 1 CSS. When QCL-TypeD for PDCCH from Type 1 CSS is the same as one of QCL-TypeD from CORESET(s) associated with the monitored search space set(s) of the overlapping ePDCCH from Type3 CSS, the UE monitors both ePDCCH from Type 3 CSS and PDCCH from Type 1 CSS. When any one of QCL-TypeD from CORESET(s) associated with the monitored Type3 CSSs of the overlapping ePDCCH is different from QCL-TypeD from the CORESET associated with the monitored Type1 CSS of the overlapping PDCCH, the UE does not expect to monitor the overlapping ePDCCH associated with Type3 CSSs. When one candidate associated with Type3 CSSs is not monitored, the UE still monitors the linked candidate that is not dropped and interprets the DCI based on Release 17 PDCCH rules (e.g., based on reference PDCCH candidate). It can be used for Case A, Case B and Case C.

Multiple search space sets may be configured with partial or full overlapping for monitoring occasions. UE may identify one or two QCL-TypeD properties for monitoring. For example, the identified scheme can reuse priority rule defined in Release 15 to identify the first QCL-TypeD property; and then, identify the second QCL-TypeD property according to one of the SS sets that is linked with a SS set with the first QCL-TypeD property (among the multiple overlapping CORESETs). In the case of multiple such SS set pairs, the Release 15 priority order may be followed for the determination of the second QCL-TypeD property. In the case that there is no such SS set pair, a second QCL-TypeD property may not be determined. The assumptions on QCL-TypeD for the CSI-RS/SSB/PDSCH/PDCCH disclosed in the present disclosure may be the same as one or two of the identified QCL-TypeD properties from the ePDCCH. From ePDCCH monitoring's point of view, the UE may only monitor the search space sets based on the identified QCL-TypeD properties.

Figure 5:
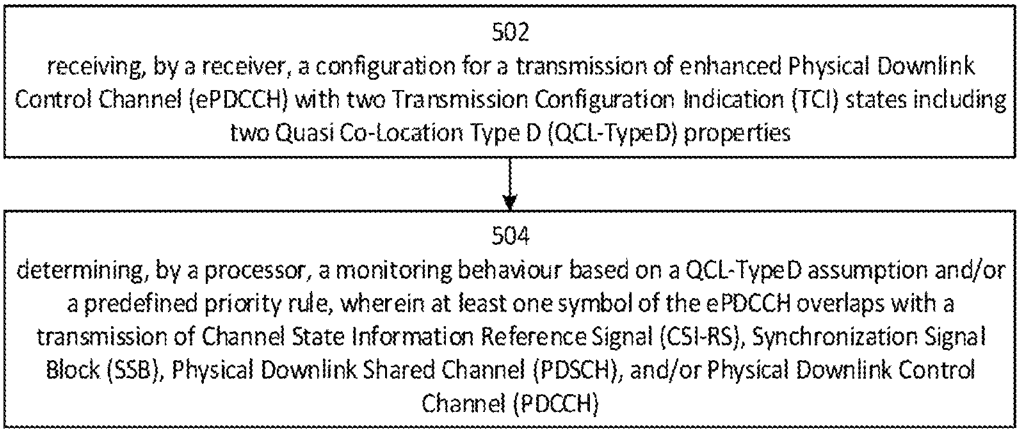
FIG. 5 is a flow chart illustrating steps of monitoring behaviour determination for overlapping ePDCCH and CSI-RS/SSB/PDSCH/PDCCH by UE in accordance with some implementations of the present disclosure.

FIG. 5 is a flow chart illustrating steps of monitoring behaviour determination for overlapping ePDCCH and CSI-RS/SSB/PDSCH/PDCCH by UE 200 in accordance with some implementations of the present disclosure.

At step 502, the receiver 214 of UE 200 receives a configuration for a transmission of enhanced Physical Downlink Control Channel (ePDCCH) with two Transmission Configuration Indication (TCI) states including two Quasi Co-Location Type D (QCL-TypeD) properties.

At step 504, the processor 202 of UE 200 determines a monitoring behaviour based on a QCL-TypeD assumption and/or a predefined priority rule, wherein at least one symbol of the ePDCCH overlaps with a transmission of Channel State Information Reference Signal (CSI-RS), Synchronization Signal Block (SSB), Physical Downlink Shared Channel (PDSCH), and/or Physical Downlink Control Channel (PDCCH).

Figure 6:
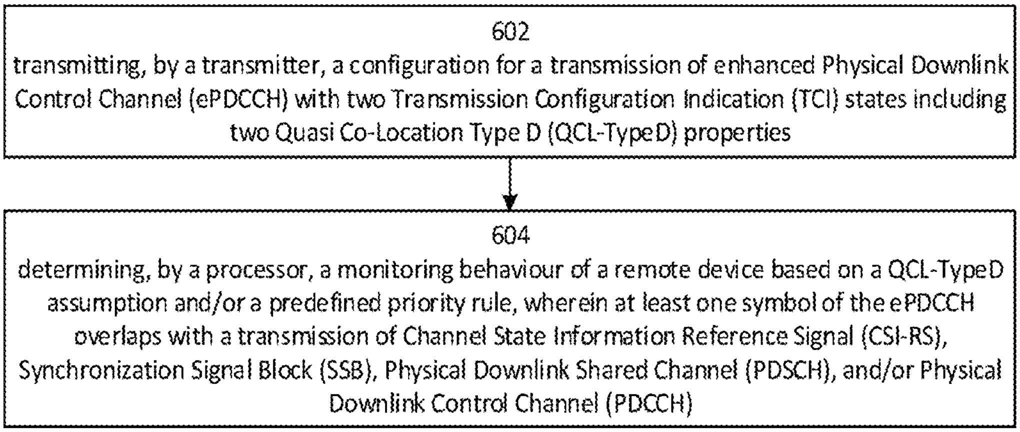
FIG. 6 is a flow chart illustrating steps of monitoring behaviour determination for overlapping ePDCCH and CSI-RS/SSB/PDSCH/PDCCH by gNB or NE in accordance with some implementations of the present disclosure.

FIG. 6 is a flow chart illustrating steps of monitoring behaviour determination for overlapping ePDCCH and CSI-RS/SSB/PDSCH/PDCCH by gNB or NE 300 in accordance with some implementations of the present disclosure.

At step 602, the transmitter 312 of NE 300 transmits a configuration for a transmission of enhanced Physical Downlink Control Channel (ePDCCH) with two Transmission Configuration Indication (TCI) states including two Quasi Co-Location Type D (QCL-TypeD) properties.

At step 604, the processor 302 of NE 300 determines a monitoring behaviour of a remote device based on a QCL-TypeD assumption and/or a predefined priority rule, wherein at least one symbol of the ePDCCH overlaps with a transmission of Channel State Information Reference Signal (CSI-RS), Synchronization Signal Block (SSB), Physical Downlink Shared Channel (PDSCH), and/or Physical Downlink Control Channel (PDCCH).

In one aspect, some items as examples of the disclosure concerning a method of a UE or remote device may be summarized as follows:

1. A method, comprising:
receiving, by a receiver, a configuration for a transmission of enhanced Physical Downlink Control Channel (ePDCCH) with two Transmission Configuration Indication (TCI) states including two Quasi Co-Location Type D (QCL-TypeD) properties; and
determining, by a processor, a monitoring behaviour based on a QCL-TypeD assumption and/or a predefined priority rule, wherein at least one symbol of the ePDCCH overlaps with a transmission of Channel State Information Reference Signal (CSI-RS), Synchronization Signal Block (SSB), Physical Downlink Shared Channel (PDSCH), and/or Physical Downlink Control Channel (PDCCH).
2. The method of item 1, wherein the ePDCCH is transmitted with:
two Control Resource Sets (CORESETs), each associated with one TCI state including one Quasi Co-Location Type D (QCL-TypeD) property, with repetition; or
one CORESET with two TCI states including two QCL-TypeD properties for Single Frequency Network (SFN) based ePDCCH.
3. The method of item 1, wherein the QCL-TypeD assumption comprises that the CSI-RS and one PDCCH DM-RS port transmitted in monitored search space set, or sets, associated with CORESET, or CORESETs, of the ePDCCH are quasi co-located with QCL-TypeD.
4. The method of item 1 or 3, wherein the QCL-TypeD assumption comprises that a QCL-TypeD property for the CSI-RS is as indicated by RRC signalling.
5. The method of item 1 or 3, wherein the QCL-TypeD assumption comprises that a QCL-TypeD property for the CSI-RS is one specific QCL-TypeD property for CORESET, or CORESETs, associated with monitored search space set, or sets, of the ePDCCH.
6. The method of item 5, wherein the specific QCL-TypeD property is a first TCI state from a CORESET associated with a first search space set among two configured linked search space sets or a first TCI state from two activated TCI from a CORESET.
7. The method of item 5, wherein the specific QCL-TypeD property is determined based on an RRC configuration and/or a predefined rule.
8. The method of item 1, wherein a higher priority is assigned to the ePDCCH than the CSI-RS; and it is not expected to detect the CSI-RS, wherein the ePDCCH overlaps with the CSI-RS and a QCL-TypeD property for the CSI-RS is not configured as any one of the two QCL-TypeD properties.
9. The method of item 1, wherein the CSI-RS is an aperiodic CSI-RS; a higher priority is assigned for the CSI-RS than the ePDCCH; and it is not expected to monitor the ePDCCH, wherein the ePDCCH overlaps with the CSI-RS and a QCL-TypeD property for the CSI-RS is not configured as any one of the two QCL-TypeD properties.
10. The method of item 1, wherein the QCL-TypeD assumption comprises that the SSB and an ePDCCH DM-RS, or an ePDCCH DM-RS port, transmitted in one of monitored search space sets associated with CORESET are quasi co-located or indirectly quasi co-located with QCL-TypeD.
11. The method of item 1, wherein a higher priority is assigned for the ePDCCH than the SSB, and it is not expected to detect the SSB, wherein the ePDCCH overlaps with the SSB and a QCL-TypeD property for the SSB is not configured as any one of the two QCL-TypeD properties.
12. The method of item 1, wherein a higher priority is assigned for the SSB than the ePDCCH, and it is not expected to monitor the ePDCCH, wherein the ePDCCH overlaps with the SSB and a QCL-TypeD property for the SSB is not configured as any one of the two QCL-TypeD properties.
13. The method of item 1, wherein the QCL-TypeD assumption comprises that the PDSCH and one or two PDCCH DM-RS ports transmitted in monitored search space set, or sets, associated with CORESET, or CORESETs, of the ePDCCH are quasi co-located with QCL-TypeD.
14. The method of item 1, wherein a higher priority is assigned for the PDSCH than the ePDCCH, and it is not expected to monitor the ePDCCH, wherein the ePDCCH overlaps with the PDSCH and a QCL-TypeD property for the PDSCH is not configured as any one of the two QCL-TypeD properties.
15. The method of item 14, wherein the PDSCH is scheduled by a PDCCH associated with Type1 Common Search Space (CSS).
16. The method of item 1, wherein the ePDCCH is associated with Type 3 CSS; and the QCL-TypeD assumption comprises that the PDCCH DM-RS port transmitted in monitored Type 1 CSS and one PDCCH DM-RS port transmitted in monitored search space set, or sets, associated with CORESET, or CORESETs, of the ePDCCH are quasi co-located with QCL-TypeD, wherein the PDCCH for Type 1 CSS overlaps with the ePDCCH.
17. The method of item 1, wherein the ePDCCH is associated with Type 3 CSS; and the QCL-TypeD assumption comprises that the ePDCCH and a PDCCH for Type 1 CSS are quasi-colocated with QCL-TypeD wherein the PDCCH for Type 1 CSS overlaps with the ePDCCH.
18. The method of item 1, wherein the ePDCCH is associated with Type 3 CSS; a higher priority is assigned for monitoring PDCCH for Type 1 CSS than the ePDCCH; and it is not expected to monitor the ePDCCH wherein the PDCCH for Type1 CSS overlaps with the ePDCCH, and a QCL-TypeD property for the PDCCH for Type1 CSS is not configured as any one of the two QCL-TypeD properties.
19. The method of item 9, 12, 14, or 18, wherein it is expected to monitor a linked candidate of the ePDCCH that is not dropped, and to interpret DCI based on a reference PDCCH candidate.

In another aspect, some items as examples of the disclosure concerning a method of a NE or gNB may be summarized as follows:

20. A method, comprising:
transmitting, by a transmitter, a configuration for a transmission of enhanced Physical Downlink Control Channel (ePDCCH) with two Transmission Configuration Indication (TCI) states including two Quasi Co-Location Type D (QCL-TypeD) properties; and
determining, by a processor, a monitoring behaviour of a remote device based on a QCL-TypeD assumption and/or a predefined priority rule, wherein at least one symbol of the ePDCCH overlaps with a transmission of Channel State Information Reference Signal (CSI-RS), Synchronization Signal Block (SSB), Physical Downlink Shared Channel (PDSCH), and/or Physical Downlink Control Channel (PDCCH).

21. The method of item 20, wherein the ePDCCH is transmitted with:

two Control Resource Sets (CORESETs), each associated with one TCI state including one Quasi Co-Location Type D (QCL-TypeD) property, with repetition; or one CORESET with two TCI states including two QCL-TypeD properties for Single Frequency Network (SFN) based ePDCCH.

22. The method of item 20, wherein the QCL-TypeD assumption comprises that the CSI-RS and one PDCCH DM-RS port transmitted in monitored search space set, or sets, associated with CORESET, or CORESETs, of the ePDCCH are quasi co-located with QCL-TypeD.

23. The method of item 20 or 22, wherein the QCL-TypeD assumption comprises that a QCL-TypeD property for the CSI-RS is as indicated by RRC signalling.

24. The method of item 20 or 22, wherein the QCL-TypeD assumption comprises that a QCL-TypeD property for the CSI-RS is one specific QCL-TypeD property for CORESET, or CORESETs, associated with monitored search space set, or sets, of the ePDCCH.

25. The method of item 24, wherein the specific QCL-TypeD property is a first TCI state from a CORESET associated with a first search space set among two configured linked search space sets or a first TCI state from two activated TCI from a CORESET.

26. The method of item 24, wherein the specific QCL-TypeD property is determined based on an RRC configuration and/or a predefined rule.

27. The method of item 20, wherein a higher priority is assigned to the ePDCCH than the CSI-RS; and it is not expected to detect the CSI-RS, wherein the ePDCCH overlaps with the CSI-RS and a QCL-TypeD property for the CSI-RS is not configured as any one of the two QCL-TypeD properties.

28. The method of item 20, wherein the CSI-RS is an aperiodic CSI-RS; a higher priority is assigned for the CSI-RS than the ePDCCH; and it is not expected to monitor the ePDCCH, wherein the ePDCCH overlaps with the CSI-RS and a QCL-TypeD property for the CSI-RS is not configured as any one of the two QCL-TypeD properties.

29. The method of item 20, wherein the QCL-TypeD assumption comprises that the SSB and an ePDCCH DM-RS, or an ePDCCH DM-RS port, transmitted in one of monitored search space sets associated with CORESET are quasi co-located or indirectly quasi co-located with QCL-TypeD.

30. The method of item 20, wherein a higher priority is assigned for the ePDCCH than the SSB, and it is not expected to detect the SSB, wherein the ePDCCH overlaps with the SSB and a QCL-TypeD property for the SSB is not configured as any one of the two QCL-TypeD properties.

31. The method of item 20, wherein a higher priority is assigned for the SSB than the ePDCCH, and it is not expected to monitor the ePDCCH, wherein the ePDCCH overlaps with the SSB and a QCL-TypeD property for the SSB is not configured as any one of the two QCL-TypeD properties.

32. The method of item 20, wherein the QCL-TypeD assumption comprises that the PDSCH and one or two PDCCH DM-RS ports transmitted in monitored search space set, or sets, associated with CORESET, or CORESETs, of the ePDCCH are quasi co-located with QCL-TypeD.

33. The method of item 20, wherein a higher priority is assigned for the PDSCH than the ePDCCH, and it is not expected to monitor the ePDCCH, wherein the ePDCCH overlaps with the PDSCH and a QCL-TypeD property for the PDSCH is not configured as any one of the two QCL-TypeD properties.

34. The method of item 33, wherein the PDSCH is scheduled by a PDCCH associated with Type1 Common Search Space (CSS).

35. The method of item 20, wherein the ePDCCH is associated with Type 3 CSS; and the QCL-TypeD assumption comprises that the PDCCH DM-RS port transmitted in monitored Type 1 CSS and one PDCCH DM-RS port transmitted in monitored search space set, or sets, associated with CORESET, or CORESETs, of the ePDCCH are quasi co-located with QCL-TypeD, wherein the PDCCH for Type 1 CSS overlaps with the ePDCCH.

36. The method of item 20, wherein the cPDCCH is associated with Type 3 CSS; and the QCL-TypeD assumption comprises that the ePDCCH and a PDCCH for Type 1 CSS are quasi-colocated with QCL-TypeD wherein the PDCCH for Type 1 CSS overlaps with the ePDCCH.

37. The method of item 20, wherein the ePDCCH is associated with Type 3 CSS; a higher priority is assigned for monitoring PDCCH for Type 1 CSS than the ePDCCH; and it is not expected to monitor the ePDCCH wherein the PDCCH for Type1 CSS overlaps with the ePDCCH, and a QCL-TypeD property for the PDCCH for Type1 CSS is not configured as any one of the two QCL-TypeD properties.

38. The method of item 28, 31, 33, or 37, wherein it is expected to monitor a linked candidate of the ePDCCH that is not dropped, and to interpret DCI based on a reference PDCCH candidate.

In a further aspect, some items as examples of the disclosure concerning a UE or remote device may be summarized as follows:

39. An apparatus, comprising:

a receiver that receives a configuration for a transmission of enhanced Physical Downlink Control Channel (ePDCCH) with two Transmission Configuration Indication (TCI) states including two Quasi Co-Location Type D (QCL-TypeD) properties; and a processor that determines a monitoring behaviour based on a QCL-TypeD assumption and/or a predefined priority rule, wherein at least one symbol of the ePDCCH overlaps with a transmission of Channel State Information Reference Signal (CSI-RS), Synchronization Signal Block (SSB), Physical Downlink Shared Channel (PDSCH), and/or Physical Downlink Control Channel (PDCCH).

40. The apparatus of item 39, wherein the ePDCCH is transmitted with:

two Control Resource Sets (CORESETs), each associated with one TCI state including one Quasi Co-Location Type D (QCL-TypeD) property, with repetition; or one CORESET with two TCI states including two QCL-TypeD properties for Single Frequency Network (SFN) based ePDCCH.

41. The apparatus of item 39, wherein the QCL-TypeD assumption comprises that the CSI-RS and one PDCCH DM-RS port transmitted in monitored search space set, or sets, associated with CORESET, or CORESETs, of the ePDCCH are quasi co-located with QCL-TypeD.

42. The apparatus of item 39 or 41, wherein the QCL-TypeD assumption comprises that a QCL-TypeD property for the CSI-RS is as indicated by RRC signalling.

43. The apparatus of item 39 or 41, wherein the QCL-TypeD assumption comprises that a QCL-TypeD property for the CSI-RS is one specific QCL-TypeD property for CORESET, or CORESETs, associated with monitored search space set, or sets, of the ePDCCH.

44. The apparatus of item 43, wherein the specific QCL-TypeD property is a first TCI state from a CORESET associated with a first search space set among two configured linked search space sets or a first TCI state from two activated TCI from a CORESET.

45. The apparatus of item 43, wherein the specific QCL-TypeD property is determined based on an RRC configuration and/or a predefined rule.

46. The apparatus of item 39, wherein a higher priority is assigned to the ePDCCH than the CSI-RS; and it is not expected to detect the CSI-RS, wherein the ePDCCH overlaps with the CSI-RS and a QCL-TypeD property for the CSI-RS is not configured as any one of the two QCL-TypeD properties.

47. The apparatus of item 39, wherein the CSI-RS is an aperiodic CSI-RS; a higher priority is assigned for the CSI-RS than the ePDCCH; and it is not expected to monitor the ePDCCH, wherein the ePDCCH overlaps with the CSI-RS and a QCL-TypeD property for the CSI-RS is not configured as any one of the two QCL-TypeD properties.

48. The apparatus of item 39, wherein the QCL-TypeD assumption comprises that the SSB and an ePDCCH DM-RS, or an ePDCCH DM-RS port, transmitted in one of monitored search space sets associated with CORESET are quasi co-located or indirectly quasi co-located with QCL-TypeD.

49. The apparatus of item 39, wherein a higher priority is assigned for the ePDCCH than the SSB, and it is not expected to detect the SSB, wherein the ePDCCH overlaps with the SSB and a QCL-TypeD property for the SSB is not configured as any one of the two QCL-TypeD properties.

50. The apparatus of item 39, wherein a higher priority is assigned for the SSB than the ePDCCH, and it is not expected to monitor the ePDCCH, wherein the ePDCCH overlaps with the SSB and a QCL-TypeD property for the SSB is not configured as any one of the two QCL-TypeD properties.

51. The apparatus of item 39, wherein the QCL-TypeD assumption comprises that the PDSCH and one or two PDCCH DM-RS ports transmitted in monitored search space set, or sets, associated with CORESET, or CORESETs, of the ePDCCH are quasi co-located with QCL-TypeD.

52. The apparatus of item 39, wherein a higher priority is assigned for the PDSCH than the ePDCCH, and it is not expected to monitor the ePDCCH, wherein the ePDCCH overlaps with the PDSCH and a QCL-TypeD property for the PDSCH is not configured as any one of the two QCL-TypeD properties.

53. The apparatus of item 52, wherein the PDSCH is scheduled by a PDCCH associated with Type1 Common Search Space (CSS).

54. The apparatus of item 39, wherein the ePDCCH is associated with Type 3 CSS; and the QCL-TypeD assumption comprises that the PDCCH DM-RS port transmitted in monitored Type 1 CSS and one PDCCH DM-RS port transmitted in monitored search space set, or sets, associated with CORESET, or CORESETs, of the ePDCCH are quasi co-located with QCL-TypeD, wherein the PDCCH for Type 1 CSS overlaps with the ePDCCH.

55. The apparatus of item 39, wherein the ePDCCH is associated with Type 3 CSS; and the QCL-TypeD assumption comprises that the ePDCCH and a PDCCH for Type 1 CSS are quasi-colocated with QCL-TypeD wherein the PDCCH for Type 1 CSS overlaps with the ePDCCH.

56. The apparatus of item 39, wherein the ePDCCH is associated with Type 3 CSS; a higher priority is assigned for monitoring PDCCH for Type 1 CSS than the ePDCCH; and it is not expected to monitor the ePDCCH wherein the PDCCH for Type1 CSS overlaps with the ePDCCH, and a QCL-TypeD property for the PDCCH for Type1 CSS is not configured as any one of the two QCL-TypeD properties.

57. The apparatus of item 47, 50, 52, or 56, wherein it is expected to monitor a linked candidate of the ePDCCH that is not dropped, and to interpret DCI based on a reference PDCCH candidate.

In a yet further aspect, some items as examples of the disclosure concerning a NE or gNB may be summarized as follows:

58. An apparatus, comprising:

a transmitter that transmits a configuration for a transmission of enhanced Physical Downlink Control Channel (ePDCCH) with two Transmission Configuration Indication (TCI) states including two Quasi Co-Location Type D (QCL-TypeD) properties; and a processor that determines a monitoring behaviour of a remote device based on a QCL-TypeD assumption and/or a predefined priority rule, wherein at least one symbol of the ePDCCH overlaps with a transmission of Channel State Information Reference Signal (CSI-RS), Synchronization Signal Block (SSB), Physical Downlink Shared Channel (PDSCH), and/or Physical Downlink Control Channel (PDCCH).

59. The apparatus of item 58, wherein the ePDCCH is transmitted with:

two Control Resource Sets (CORESETs), each associated with one TCI state including one Quasi Co-Location Type D (QCL-TypeD) property, with repetition; or one CORESET with two TCI states including two QCL-TypeD properties for Single Frequency Network (SFN) based ePDCCH.

60. The apparatus of item 58, wherein the QCL-TypeD assumption comprises that the CSI-RS and one PDCCH DM-RS port transmitted in monitored search space set, or sets, associated with CORESET, or CORESETs, of the ePDCCH are quasi co-located with QCL-TypeD.

61. The apparatus of item 58 or 60, wherein the QCL-TypeD assumption comprises that a QCL-TypeD property for the CSI-RS is as indicated by RRC signalling.

62. The apparatus of item 58 or 60, wherein the QCL-TypeD assumption comprises that a QCL-TypeD property for the CSI-RS is one specific QCL-TypeD property for CORESET, or CORESETs, associated with monitored search space set, or sets, of the ePDCCH.

63. The apparatus of item 62, wherein the specific QCL-TypeD property is a first TCI state from a CORESET associated with a first search space set among two configured linked search space sets or a first TCI state from two activated TCI from a CORESET.

64. The apparatus of item 62, wherein the specific QCL-TypeD property is determined based on an RRC configuration and/or a predefined rule.

65. The apparatus of item 58, wherein a higher priority is assigned to the ePDCCH than the CSI-RS; and it is not expected to detect the CSI-RS, wherein the ePDCCH overlaps with the CSI-RS and a QCL-TypeD property for the CSI-RS is not configured as any one of the two QCL-TypeD properties.

66. The apparatus of item 58, wherein the CSI-RS is an aperiodic CSI-RS; a higher priority is assigned for the CSI-RS than the ePDCCH; and it is not expected to monitor the ePDCCH, wherein the ePDCCH overlaps with the CSI-RS and a QCL-TypeD property for the CSI-RS is not configured as any one of the two QCL-TypeD properties.

67. The apparatus of item 58, wherein the QCL-TypeD assumption comprises that the SSB and an ePDCCH DM-RS, or an ePDCCH DM-RS port, transmitted in one of monitored search space sets associated with CORESET are quasi co-located or indirectly quasi co-located with QCL-TypeD.

68. The apparatus of item 58, wherein a higher priority is assigned for the ePDCCH than the SSB, and it is not expected to detect the SSB, wherein the ePDCCH overlaps with the SSB and a QCL-TypeD property for the SSB is not configured as any one of the two QCL-TypeD properties.

69. The apparatus of item 58, wherein a higher priority is assigned for the SSB than the ePDCCH, and it is not expected to monitor the ePDCCH, wherein the ePDCCH overlaps with the SSB and a QCL-TypeD property for the SSB is not configured as any one of the two QCL-TypeD properties.

70. The apparatus of item 58, wherein the QCL-TypeD assumption comprises that the PDSCH and one or two PDCCH DM-RS ports transmitted in monitored search space set, or sets, associated with CORESET, or CORESETs, of the ePDCCH are quasi co-located with QCL-TypeD.

71. The apparatus of item 58, wherein a higher priority is assigned for the PDSCH than the ePDCCH, and it is not expected to monitor the ePDCCH, wherein the ePDCCH overlaps with the PDSCH and a QCL-TypeD property for the PDSCH is not configured as any one of the two QCL-TypeD properties.

72. The apparatus of item 71, wherein the PDSCH is scheduled by a PDCCH associated with Type1 Common Search Space (CSS).

73. The apparatus of item 58, wherein the ePDCCH is associated with Type 3 CSS; and the QCL-TypeD assumption comprises that the PDCCH DM-RS port transmitted in monitored Type 1 CSS and one PDCCH DM-RS port transmitted in monitored search space set, or sets, associated with CORESET, or CORESETs, of the ePDCCH are quasi co-located with QCL-TypeD, wherein the PDCCH for Type 1 CSS overlaps with the ePDCCH.

74. The apparatus of item 58, wherein the ePDCCH is associated with Type 3 CSS; and the QCL-TypeD assumption comprises that the ePDCCH and a PDCCH for Type 1 CSS are quasi-colocated with QCL-TypeD wherein the PDCCH for Type 1 CSS overlaps with the ePDCCH.

75. The apparatus of item 58, wherein the ePDCCH is associated with Type 3 CSS; a higher priority is assigned for monitoring PDCCH for Type 1 CSS than the ePDCCH; and it is not expected to monitor the ePDCCH wherein the PDCCH for Type1 CSS overlaps with the ePDCCH, and a QCL-TypeD property for the PDCCH for Type1 CSS is not configured as any one of the two QCL-TypeD properties.

76. The apparatus of item 66, 69, 71, or 75, wherein it is expected to monitor a linked candidate of the ePDCCH that is not dropped, and to interpret DCI based on a reference PDCCH candidate.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A user equipment (UE) for wireless communication, comprising:

at least one memory; and at least one processor coupled with the at least one memory and configured to cause the UE to:

receive a configuration for a transmission of enhanced Physical Downlink Control Channel (ePDCCH) with two Transmission Configuration Indication (TCI) states including two Quasi Co-Location Type D (QCL-TypeD) properties; and determine a monitoring behaviour based on one or more of a QCL-TypeD assumption or a predefined priority rule, at least one symbol of the ePDCCH overlapping with one or more of a transmission of Channel State Information Reference Signal (CSI-RS), Synchronization Signal Block (SSB), Physical Downlink Shared Channel (PDSCH), or Physical Downlink Control Channel (PDCCH).

2. The UE of claim 1, wherein the at least one processor is configured to cause the UE to transmit the ePDCCH with one or more of:

two Control Resource Sets (CORESETs), each associated with one TCI state including one QCL-TypeD property, with repetition; or one CORESET with two TCI states including two QCL-TypeD properties for Single Frequency Network (SFN) based ePDCCH.

3. The UE of claim 1, wherein the QCL-TypeD assumption comprises that the CSI-RS and one PDCCH Demodulation Reference Signal (DM-RS) port transmitted in one or more monitored search space sets associated with one or more Control Resource Sets (CORESETs) of the ePDCCH are quasi co-located with QCL-TypeD.

4. The UE of claim 1, wherein the QCL-TypeD assumption comprises that a QCL-TypeD property for the CSI-RS is as indicated by Radio Resource Control (RRC) signalling.

5. The UE of claim 1, wherein the QCL-TypeD assumption comprises that a QCL-TypeD property for the CSI-RS is one specific QCL-TypeD property for one or more Control Resource Sets (CORESETs) associated with one or more monitored search space sets of the ePDCCH.

6. The UE of claim 5, wherein the specific QCL-TypeD property comprises one or more of a first TCI state from a CORESET associated with a first search space set among two configured linked search space sets or a first TCI state from two activated TCI from a CORESET.

7. The UE of claim 1, wherein a higher priority is assigned to the ePDCCH than the CSI-RS; and the UE is not expected to detect the CSI-RS, wherein the ePDCCH overlaps with the CSI-RS and a QCL-TypeD property for the CSI-RS is not configured as one or more of the two QCL-TypeD properties.

8. The UE of claim 1, wherein the CSI-RS comprises an aperiodic CSI-RS; a higher priority is assigned for the CSI-RS than the ePDCCH; and the UE is not expected to monitor the ePDCCH, wherein the ePDCCH overlaps with the CSI-RS and a QCL-TypeD property for the CSI-RS is not configured as one or more of the two QCL-TypeD properties.

9. The UE of claim 1, wherein the QCL-TypeD assumption comprises that the SSB and one or more of an ePDCCH Demodulation Reference Signal (DM-RS), or an ePDCCH DM-RS port transmitted in one or more monitored search space sets associated with CORESET are quasi co-located or indirectly quasi co-located with QCL-TypeD.

10. The UE of claim 1, wherein a higher priority is assigned for the SSB than the ePDCCH, and the UE is not expected to monitor the ePDCCH, wherein the ePDCCH overlaps with the SSB and a QCL-TypeD property for the SSB is not configured as one or more of the two QCL-TypeD properties.

11. The UE of claim 1, wherein the QCL-TypeD assumption comprises that the PDSCH and one or more PDCCH Demodulation Reference Signal (DM-RS) ports transmitted in one or more monitored search space sets associated with one or more Control Resource Sets (CORESETs) of the ePDCCH are quasi co-located with QCL-TypeD.

12. The UE of claim 1, wherein a higher priority is assigned for the PDSCH than the ePDCCH, and the UE is not expected to monitor the ePDCCH, wherein the ePDCCH overlaps with the PDSCH and a QCL-TypeD property for the PDSCH is not configured as one or more of the two QCL-TypeD properties; and the PDSCH is scheduled by a PDCCH associated with Type1 Common Search Space (CSS).

13. The UE of claim 1, wherein the ePDCCH is associated with Type 3 Common Search Space (CSS); and the QCL-TypeD assumption comprises that the PDCCH Demodulation Reference Signal (DM-RS) port transmitted in monitored Type 1 CSS and one PDCCH DM-RS port transmitted in one or more monitored search space sets associated with one or more Control Resource Sets (CORESETs) of the ePDCCH are quasi co-located with QCL-TypeD, wherein the PDCCH for Type 1 CSS overlaps with the ePDCCH.

14. The UE of claim 1, wherein the ePDCCH is associated with Type 3 Common Search Space (CSS); a higher priority is assigned for monitoring PDCCH for Type 1 CSS than the ePDCCH; and the UE is not expected to monitor the ePDCCH wherein the PDCCH for Type1 CSS overlaps with the ePDCCH, and a QCL-TypeD property for the PDCCH for Type1 CSS is not configured as one or more of the two QCL-TypeD properties.

15. The UE of claim 14, wherein the UE is expected to monitor a linked candidate of the ePDCCH that is not dropped, and to interpret DCI based on a reference PDCCH candidate.

16. A processor for wireless communication, comprising:
at least one controller coupled with at least one memory and configured to cause the processor to:
receive a configuration for a transmission of enhanced Physical Downlink Control Channel (ePDCCH) with two Transmission Configuration Indication (TCI) states including two Quasi Co-Location Type D (QCL-TypeD) properties; and
determine a monitoring behaviour based on one or more of a QCL-TypeD assumption or a predefined priority rule, at least one symbol of the ePDCCH overlapping with one or more of a transmission of Channel State Information Reference Signal (CSI-RS), Synchronization Signal Block (SSB), Physical Downlink Shared Channel (PDSCH), or Physical Downlink Control Channel (PDCCH).

17. The processor of claim 16, wherein the at least one controller is configured to cause the processor to transmit the ePDCCH with one or more of:
two Control Resource Sets (CORESETs), each associated with one TCI state including one QCL-TypeD property, with repetition; or
one CORESET with two TCI states including two QCL-TypeD properties for Single Frequency Network (SFN) based ePDCCH.

18. A method performed by a user equipment (UE), the method comprising:
receiving a configuration for a transmission of enhanced Physical Downlink Control Channel (ePDCCH) with two Transmission Configuration Indication (TCI) states including two Quasi Co-Location Type D (QCL-TypeD) properties; and
determining a monitoring behaviour based on one or more of a QCL-TypeD assumption or a predefined priority rule, at least one symbol of the ePDCCH overlapping with one or more of a transmission of Channel State Information Reference Signal (CSI-RS), Synchronization Signal Block (SSB), Physical Downlink Shared Channel (PDSCH), or Physical Downlink Control Channel (PDCCH).

19. The method of claim 18, further comprising transmitting the ePDCCH with one or more of:
two Control Resource Sets (CORESETs), each associated with one TCI state including one QCL-TypeD property, with repetition; or
one CORESET with two TCI states including two QCL-TypeD properties for Single Frequency Network (SFN) based ePDCCH.

20. A network equipment (NE) for wireless communication, comprising:
at least one memory; and
at least one processor coupled with the at least one memory and configured to cause the NE to:
transmit a configuration for a transmission of enhanced Physical Downlink Control Channel (ePDCCH) with two Transmission Configuration Indication (TCI) states including two Quasi Co-Location Type D (QCL-TypeD) properties; and
determine a monitoring behaviour of a remote device based on one or more of a QCL-TypeD assumption or a predefined priority rule, at least one symbol of the ePDCCH overlapping with one or more of a transmission of Channel State Information Reference Signal (CSI-RS), Synchronization Signal Block (SSB), Physical Downlink Shared Channel (PDSCH), or Physical Downlink Control Channel (PDCCH).

* * * * *